United States Patent
Oetting et al.

(10) Patent No.: US 11,470,404 B2
(45) Date of Patent: Oct. 11, 2022

(54) CONSISTENT GENERATION OF MEDIA ELEMENTS ACROSS MEDIA

(71) Applicants: AT&T Intellectual Property I, L.P., Atlanta, GA (US); AT&T Mobility II LLC, Atlanta, GA (US)

(72) Inventors: John Oetting, Zionsville, PA (US); Eric Zavesky, Austin, TX (US); James Pratt, Round Rock, TX (US); Jason Decuir, Cedar Park, TX (US); Terrel Lecesne, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 120 days.

(21) Appl. No.: 16/883,907

(22) Filed: May 26, 2020

(65) Prior Publication Data

US 2021/0377627 A1 Dec. 2, 2021

(51) Int. Cl.
*G06T 13/80* (2011.01)
*H04N 21/84* (2011.01)
*H04N 21/44* (2011.01)
*G06F 16/58* (2019.01)
*G06F 16/78* (2019.01)
*H04N 21/234* (2011.01)

(52) U.S. Cl.
CPC ............ *H04N 21/84* (2013.01); *G06F 16/58* (2019.01); *G06F 16/78* (2019.01); *G06T 13/80* (2013.01); *H04N 21/23418* (2013.01); *H04N 21/44008* (2013.01)

(58) Field of Classification Search
CPC ............ H04N 21/84; H04N 21/23418; H04N 21/44008; H04N 21/23109; H04N 21/23412; H04N 21/234345; H04N 21/26603; G06F 16/58; G06F 16/78; G06T 13/80
See application file for complete search history.

(56) References Cited

U.S. PATENT DOCUMENTS

| 10,217,185 B1* | 2/2019 | Cabanero ................ G06F 3/011 |
| 10,970,843 B1* | 4/2021 | Olsen ................. H04N 21/4316 |
| 2013/0246063 A1* | 9/2013 | Teller .................... G10L 13/033 704/235 |
| 2016/0180379 A1* | 6/2016 | Salmon .............. G06Q 30/0255 705/14.53 |
| 2019/0147914 A1* | 5/2019 | Puri ................... H04N 21/4722 725/24 |

* cited by examiner

*Primary Examiner* — Shen Shiau

(57) ABSTRACT

An example method performed by a processing system includes retrieving a digital model of a media element from a database storing a plurality of media elements, wherein the media element is to be inserted into a scene of an audiovisual media, rendering the media element in the scene of the audiovisual media, based on the digital model of the media element and on metadata associated with the digital model to produce a rendered media element, wherein the metadata describes a characteristic of the media element and a limit on the characteristic, and inserting the rendered media element into the scene of the audiovisual media.

20 Claims, 4 Drawing Sheets

CONSISTENT GENERATION OF MEDIA ELEMENTS ACROSS MEDIA

The present disclosure relates generally to audiovisual media, and relates more particularly to devices, non-transitory computer-readable media, and methods for ensuring consistent generation of media elements across various media.

BACKGROUND

Creators of audiovisual media, such as film and television studios and video game developers, often reuse media elements (e.g., characters, objects, or the like) in different content. For instance, the same character or object may be depicted in multiple different films (e.g., a superhero character or a spacecraft who is part of a multi-film franchise).

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
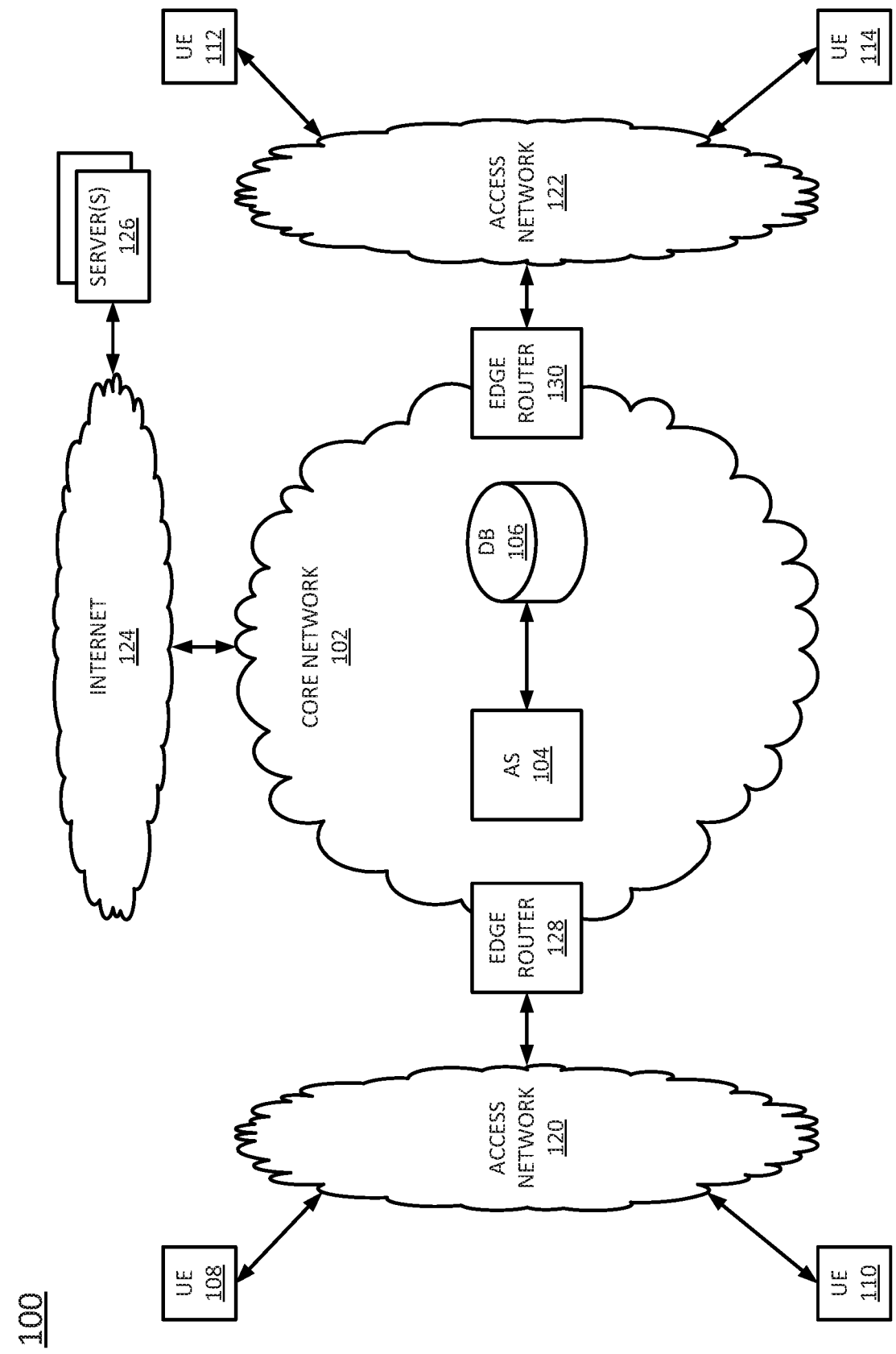
FIG. 1 illustrates an example system in which examples of the present disclosure for ensuring consistent generation of media elements across various media may operate.

The present disclosure broadly discloses methods, computer-readable media, and systems for ensuring consistent generation of media elements across various media. In one example, a method performed by a processing system including at least one processor includes retrieving a digital model of a media element from a database storing a plurality of media elements, wherein the media element is to be inserted into a scene of an audiovisual media, rendering the media element in the scene of the audiovisual media, based on the digital model of the media element and on metadata associated with the digital model to produce a rendered media element, wherein the metadata describes a characteristic of the media element and a limit on the characteristic, and inserting the rendered media element into the scene of the audiovisual media.

In another example, a non-transitory computer-readable medium may store instructions which, when executed by a processing system in a communications network, cause the processing system to perform operations. The operations may include retrieving a digital model of a media element from a database storing a plurality of media elements, wherein the media element is to be inserted into a scene of an audiovisual media, rendering the media element in the scene of the audiovisual media, based on the digital model of the media element and on metadata associated with the digital model to produce a rendered media element, wherein the metadata describes a characteristic of the media element and a limit on the characteristic, and inserting the rendered media element into the scene of the audiovisual media.

In another example, a device may include a processing system including at least one processor and a non-transitory computer-readable medium storing instructions which, when executed by the processing system when deployed in a communications network, cause the processing system to perform operations. The operations may include retrieving a digital model of a media element from a database storing a plurality of media elements, wherein the media element is to be inserted into a scene of an audiovisual media, rendering the media element in the scene of the audiovisual media, based on the digital model of the media element and on metadata associated with the digital model to produce a rendered media element, wherein the metadata describes a characteristic of the media element and a limit on the characteristic, and inserting the rendered media element into the scene of the audiovisual media.

As discussed above, creators of audiovisual media, such as film and television studios and video game developers, often reuse media elements (e.g., characters, objects, or the like) in different media content. For instance, the same character or object may be depicted in multiple different films (e.g., a superhero character or a spacecraft who is part of a multi-film franchise). A large part of the value of a recurring media element may be tied to the ability to depict the media element in a consistent manner across all media in which the media element appears. For instance, if the depiction of a recurring character or object varies too much from one appearance to another, the variation may be jarring and take viewers out of the experience of the media. Inconsistent depiction may also dilute the "brand" associated with the media element.

In some cases, it may be difficult to ensure perfect consistency when depicting a recurring media element. For instance, personnel (e.g., actors, visual and sound effects artists, and the like) may change from one film in a franchise to another, or from one video game in a series to the next. In addition, media elements may "crossover" from one franchise to another (e.g., two characters or objects from two different franchises or series may be brought together to interact). Thus, digitizing has emerged as a way to ensure consistent depiction of media elements across content. For instance, a three-dimensional digital rendering of an object may allow that object to be digitally inserted into any media, or to be reused in multiple different items of media content, with no or minimal variation in the object's appearance.

Although digitization has made it easier to ensure consistent depiction of media elements across media, existing approaches to maintaining and tracking usage of the digital media elements are somewhat cumbersome and expensive. For instance, most approaches utilize expensive computer vision and motion capture systems to create the digital media elements. Moreover, these approaches often require extensive manual annotation of the digital media elements and the use of specific visual fiducials to facilitate tracking the usage of the digital media elements. In addition, after dedicating so much effort and expense to creating and maintaining the digital media elements, the digital media elements often end up being stored in the media silos of the production house (e.g., effects artists) or the franchise (e.g., media content distributors) where access to the digital media elements for reuse is limited.

Examples of the present disclosure provide a way for media elements to be easily reused in different media in a manner that respects digital rights management and ensures consistency of the depiction across media. In one example, a library may store digital models of media elements. The digital models may be annotated with metadata that describes characteristics of the media elements and limits on those characteristics. The metadata may be used to modify the digital models, as appropriate, for rendering of the media elements in different scenes (where environment, context, and the like may vary, but the depiction of the media element should not). Thus, the digital models and the metadata may contain sufficient information to ensure that characteristics of media elements are depicted in a consistent manner across different media in which the media elements are depicted. These and other aspects of the present disclosure are discussed in greater detail below in connection with the examples of FIGS. 1-4.

To further aid in understanding the present disclosure, FIG. 1 illustrates an example system 100 in which examples of the present disclosure for ensuring consistent generation of media elements across various media. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like.

In one example, one or more servers 126 may be accessible to user endpoint devices 108, 110, 112, and 114 via Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for ensuring consistent generation of media elements across various media, as described herein. For instance, the AS 104 may be configured to operate as a Web portal or interface via which a user endpoint device, such as any of the UEs 108, 110, 112, and/or 114, may access an application that allows pre-existing media elements to be inserted into media in a manner that ensures consistency across all media.

Figure 4:
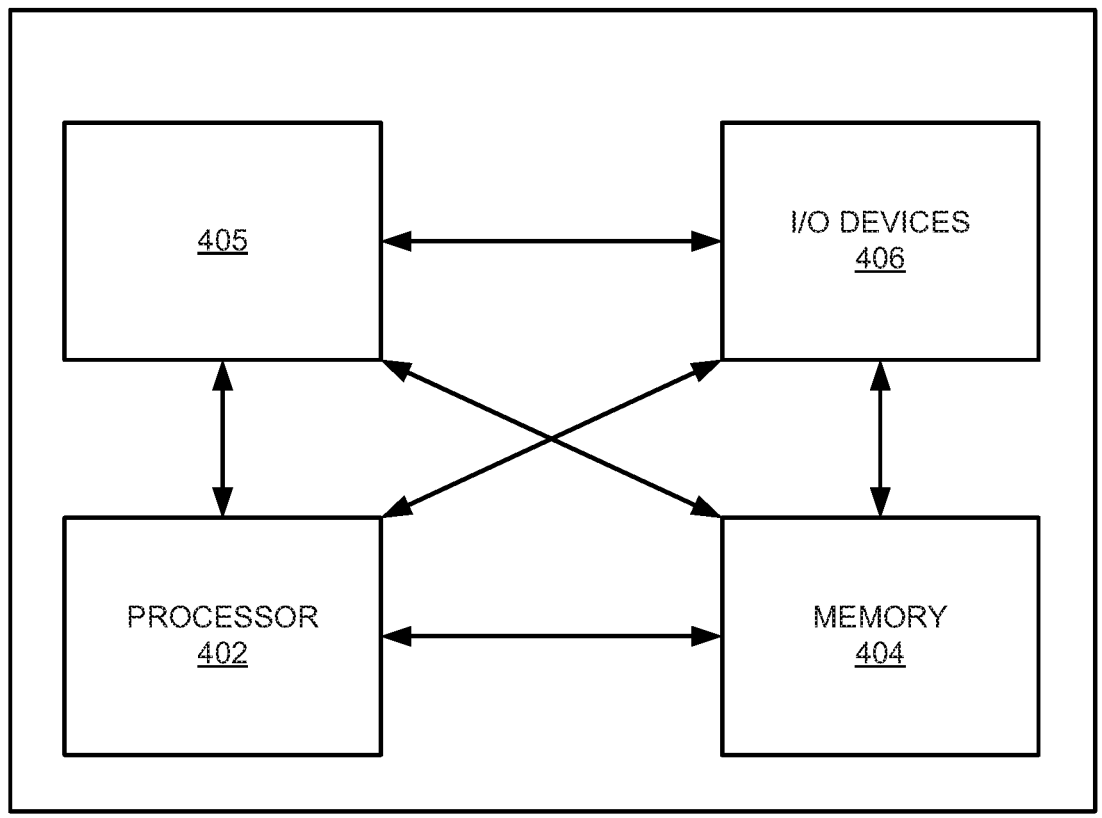
FIG. 4 illustrates an example of a computing device, or computing system, specifically programmed to perform the steps, functions, blocks, and/or operations described herein.

To this end, the AS 104 may comprise one or more physical devices, e.g., one or more computing systems or servers, such as computing system 400 depicted in FIG. 4, and may be configured as described above. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

For instance, in one example, the AS 104 may generate digital models of media elements, based on images of the media elements which may depict various views of the media elements. The digital models may be generated using one or more machine learning, computer vision, and/or audio recognition techniques. The digital models may also be three-dimensional models. The digital models may be generated by learning characteristics (e.g., physical, audio, behavioral, and/or contextual characteristics) of the media element from the plurality of images. In further examples, limits on the characteristics may be learned from the plurality of images as well (e.g., limits on the vocal range of a character, the decibel of a motorcycle roar, or the like). The characteristics and limits associated with a media element may be encoded in metadata associated with the digital model of the media element.

In further examples, the AS 104 may also render media elements for insertion in media, where the rendering is based on the digital models and metadata for the media elements. For instance, the AS 104 may render a media element based on the digital model for a media element. The AS 104 may modify the digital model based on the metadata and/or the context of the scene into which the media element is to be inserted and the behavior of the media element in the scene. For instance, the metadata may guide the AS 104 in adjusting the timbre of a character's voice to be within a specified range, or may adjust the sound of a motorcycle engine to have a specific, distinctive roar.

The AS 104 may have access to at least one database (DB) 106, where the DB 106 may store various digital models and metadata for various media elements that are available for insertion on media. For instance, as discussed above, the media elements may comprise pre-existing individuals/characters and/or objects that have appeared in previous media. In one example, DB 106 may comprise a physical storage device integrated with the AS 104 (e.g., a database server or a file server), or attached or coupled to the AS 104, to items of content, profiles, and/or synthesized content, in accordance with the present disclosure. In one example, the AS 104 may load instructions into a memory, or one or more distributed memory units, and execute the instructions for ensuring consistent generation of media elements across various media, as described herein. An example method for ensuring consistent generation of media elements across various media is described in greater detail below in connection with FIGS. 2-3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner.

For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
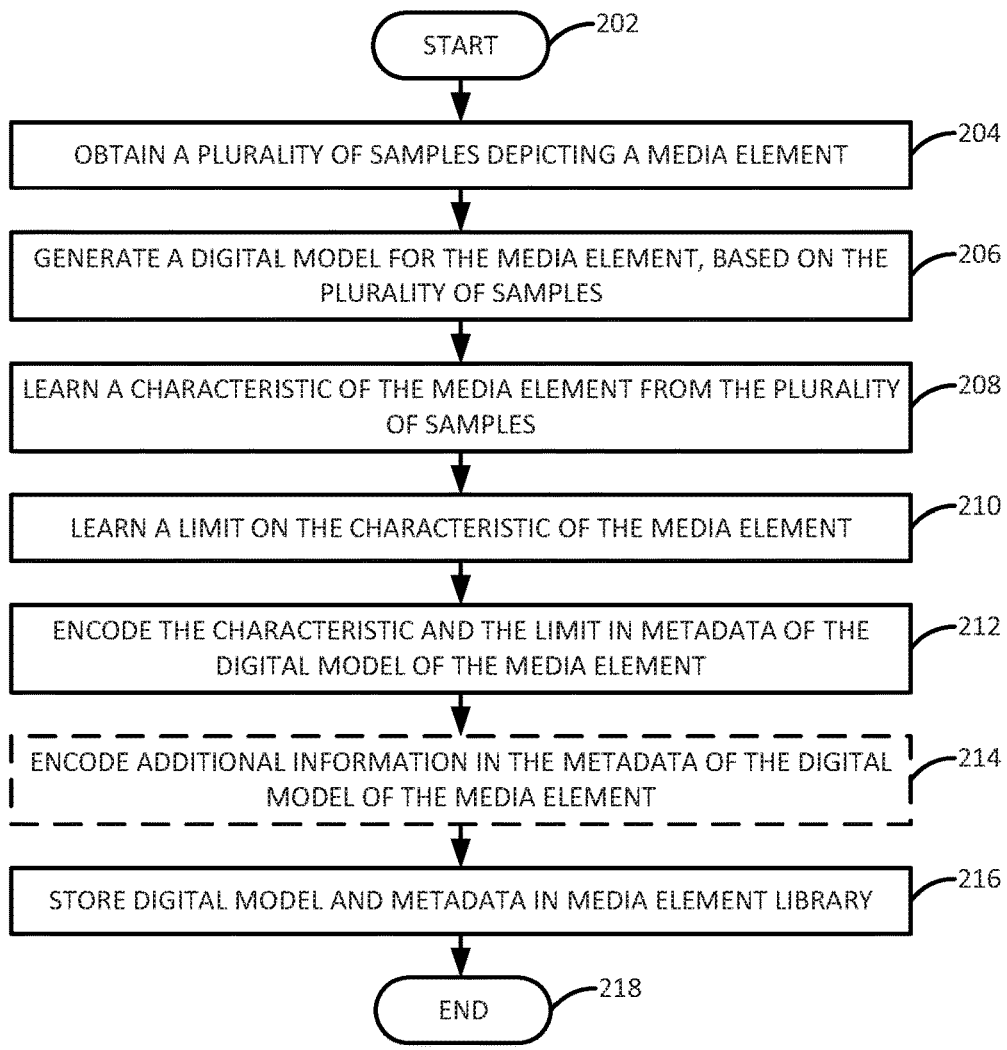
FIG. 2 illustrates a flowchart of an example method for generating digital models of media items, in accordance with the present disclosure.

FIG. 2 illustrates a flowchart of an example method 200 for generating digital models of media items, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may obtain a plurality of samples including images, audio segments, and/or text segments depicting a media element. As discussed above, the media element may comprise an individual/character (e.g., an actor or an animated/computer generated character) or an object (e.g., a vehicle, a weapon, a landmark or a building, a prop, or the like) that is depicted in an audiovisual media (e.g., a film, an episode of a television series, a commercial, a video game, an extended reality media, or the like). The plurality of images may comprise a sequence of images (e.g., video), a plurality of still images depicting different views of the media element, or a combination of video and still images.

In one example, at least some images of the plurality of images are obtained in real time (e.g., subject to any network delays) from at least one image capturing device. For instance, a video camera may capture images of the media element (e.g., as a movie is being filmed) and may send the images directly to the processing system. In another example, at least some of images of the plurality of images may be stored images, e.g., from existing video that was captured at some time in the past, such as a movie that has already been filmed and released, and stored (e.g., in a database).

In step 206, the processing system may generate a digital model for the media element, based on the plurality of samples (i.e., images, audio segments, and/or text segments). In one example, the digital model may comprise a three-dimensional digital model of the media element that may be inserted into a media. In one example, the media into which the digital model may be inserted may be any type of media having a visual component, such as a film, an episode of a television show, a commercial, a video game, an extended reality media, a still image, or the like. The digital model may be generated using one or more image processing techniques that are capable of compositing a plurality of images depicting different views of the media element. Thus, for instance, the composite of the plurality of images may approximate the way the media element looks (e.g., facial features, physical build, and the like or an individual).

In a further example, the digital model may include audio or text components. For instance, a plurality of audio segments depicting the media element may be composited by analyzing the audio segments for common frequency (pitch, formant, etc.), common envelope dynamics (e.g., attach, sustain, decay, release, etc.), and/or for common speech and activity content (e.g., automated speech recognition, object sound recognition, music recognition, etc.). Thus, for instance, a composite of the audio components may approximate the way the media element sounds (e.g., an individual's voice, accent, and the like).

In yet another example, a plurality of text segments depicting the media element may be composited from documents such as scripts, closed captioning tracks, and scene descriptions. Thus, for instance, a composite of the text segments may approximate a character's speech patterns (e.g., certain words that a character uses frequently, sentiment that is typically implied by a character, such as "persistent sophisticated sarcasm," whether the character tends to use nicknames for others, etc.) or provide more information about the sound or appearance of an object.

In step 208, the processing system may learn a characteristic of the media element from the plurality of samples (i.e., images, audio segments, and/or text segments). For instance, one or more machine learning techniques or computer vision may be applied to the plurality of images, audio segments, and/or text segments to infer the characteristic. In further examples, the processing system may apply audio recognition or sentiment analysis techniques to the plurality of audio segments in order to learn the characteristic. In further examples still, the processing system may apply text recognition or sentiment analysis techniques to the plurality of text segments in order to learn the characteristic.

In one example, a family of algorithms based on historical unsupervised clustering of elements may be chosen such that the processing system does not require manual guidance in order to determine that certain colors, sounds, text, or the like are routinely associated with a media element and in order to provide an initial grouping proposal for new instances of a characteristic.

In another example, a family of algorithms based on supervised learning (e.g., deep neural networks, support vector machines, random forests, etc.) may be utilized to associate high-level metadata (e.g., a media element's name, an intended time of day in an item of media content, and/or other script and scene elements that provide context for the media element) with low-level feature embeddings (e.g., compressed, but distinctive, representations of aural, visual, and/or textual instances) to create performant models that provide a prediction that a given characteristic is typical (or atypical) for a media element.

In another example, one or more models may be used or combined with existing machine learning model art (e.g., generative adversarial networks) in such a way as to create or generate possible characteristics that are most consistent with the historical instances of a media element from only a few initial examples. Such a system could then produce, for example, a set of candidate color characteristics (e.g., navy blue, sky blue, teal, etc.) as the most likely colors for a character's clothing, the color of a digitally added explosions or lightning associated with a superhero's activity, and the like.

In one example, the characteristic includes at least one physical characteristic of the media element. Generally, a physical characteristic may describe a visual quality of the media element (e.g., what the media element looks like). More specifically, in one example, the physical characteristic may describe the media element's size (e.g., physical dimensions such as length, width, and/or height, weight, etc.), color, shape, resemblance to a real item (e.g., a commercial product), and the like. In another example, the physical characteristic may describe at least one visual effect that is applied to the media element (e.g., a computer-generated effect).

In another example, the characteristic includes at least one contextual characteristic of the media element. Generally, a contextual characteristic may describe the circumstances in which the media element tends to be used or tends to appear in the plurality of images. More specifically, in one example, the contextual characteristic may describe the media element's location (e.g., setting in which the media element appears, such as outer space for a space craft, the ocean for a pirate ship, etc.). In another example, the contextual characteristic may describe the media element's capture settings (e.g., the frame rate, color, and/or acoustic requirements of the devices used to capture the media element's image and/or sound).

In another example, the characteristic includes at least one audio characteristic of the media element. Generally, an audio characteristic may describe what the media element sounds like. For example, the audio characteristic may describe a character's voice (e.g., the voice of a well-known actor, a regional accent, etc.), a sound made by an object (e.g., a distinctive motorcycle roar, a sound made by a superhero, etc.), or a unique sound effect associated with a character or object (e.g., the sound of a specific weapon being powered on or used in battle).

In another example, the characteristic includes at least one behavioral characteristic of the media element. Generally, a behavioral characteristic may describe the way the media element behaves in and interacts with its environment. More specifically, in one example, the behavioral characteristic may describe a typical activity associated with the media element, which may be characterized, for instance, by the specific actor playing a character in the plurality of images, the specific context depicted in the plurality of images, or the like (e.g., a specific actor may be known for appearing primarily in martial arts films, or the images may depict a character swimming or a sports car racing around a track).

In step 210, the processing system may learn a limit on the characteristic of the media element. Again, a machine learning, computer vision, and/or audio recognition technique may be applied to the plurality of images to infer the limit. The limit may define an appropriate range of values for the characteristic. For instance, if the media element is a particular character who is portrayed by two different actors, a range of timbres between the timbres of the two actor's voices may define the limits of the character's voice/the media element's audio characteristics (e.g., the timbre of the character's voice should fall within the range). In another example, the media element may be a particular car which is never shown driving slower than sixty miles per hour; thus, sixty miles per hour may define a lower limit for a speed of the car/behavioral characteristic of the media element. In another example, the media element may be a particular brand of mobile phone which is never shown being used by a villain; thus, protagonists may define a limited group of characters who may use the phone/usage characteristic of the media element.

In some cases, the processing system may detect what appears to be an anomaly in the plurality of samples (i.e., images, audio segments, and/or text segments of the media element), where the anomaly comprises a value of the characteristic that falls outside of the learned limit. For instance, the processing system may detect that the timbre of a character's voice falls outside of the typical or expected range for the character in a given video sequence. In such a case, the processing system may alert a human operator to the anomaly. This may allow the human operator to modify the video sequence, if necessary, to eliminate the anomaly. Alternatively, the anomaly may be intentional and the video sequence may remain unaltered.

In step 212, the processing system may encode the characteristic and the limit in metadata of the digital model of the media element. Thus, when the digital model is retrieved for use in a media (e.g., as discussed below in connection with FIG. 3), the metadata may be consulted in order to ensure that the depiction of the media element in the media is consistent with uses of the media element in other media. In further examples, the metadata may also include metadata describing characteristics provided by a human operator (e.g., characteristics that are not learned). These characteristics may include limitations on the use of the media element (e.g., the media element cannot be used in media having a rating higher than PG-13), fees for using the media element (e.g., licensing fees), and other information.

In one example, encoding the characteristic and the limit in the metadata of the digital model may include encoding, in the metadata, a set of alternatives for the characteristic (where each alternative is consistent with the limit). For instance, as discussed above, a range of colors may be identified for the clothing of a specific character (e.g., a set of different shades of blue). The range of colors may be encoded as possible alternatives to a primary color that is identified in the characteristic.

In optional step 214 (illustrated in phantom), the processing system may encode additional information in the metadata of the digital model of the media element. The additional information may include any information that helps in ensuring a legally and artistically faithful depiction of the media element. For instance, in one example, the additional metadata may describe or link all individuals or objects that have represented a particular character or object across multiple media. As an example, a specific metadata tag could be associated with every actor who has played the same particular character in a franchise. In another example, where an item of media content is primarily used for instruction, metadata tags may link the media element to secondary media for subsequent examples of uses in different contexts, manuals for operation, and other uses that are still within the pedagogical domain, but not included in the item of media content (e.g., for purposes of time editing, context, consistency, and the like).

In another example, the additional metadata may describe any legal constraints on the usage of the media element (e.g., contractual usage agreements, financial usage information such as fees to license the media element under one or more use cases, limits on the capture or usage of the media element, such as use cases under which the media element may not be used, and the like).

In step 216, the processing system may store the digital model, including the encoded metadata, in a library of media elements. For instance, the library of media elements may comprise a repository or database where various media elements that are available for use (and re-use) in various media may be stored. In one example, the metadata may be used to index the media elements, in order to facilitate location of media elements that meet certain criteria (e.g., characters portrayed by a specific actor, objects that appeared in specific films, etc.). The library may be maintained and controlled by a content creator (e.g., a movie studio) or a third party service provider who may have an agreement with one or more content creators to maintain and provide access to media elements owned by the content creators.

The method 200 may end in step 218.

Figure 3:
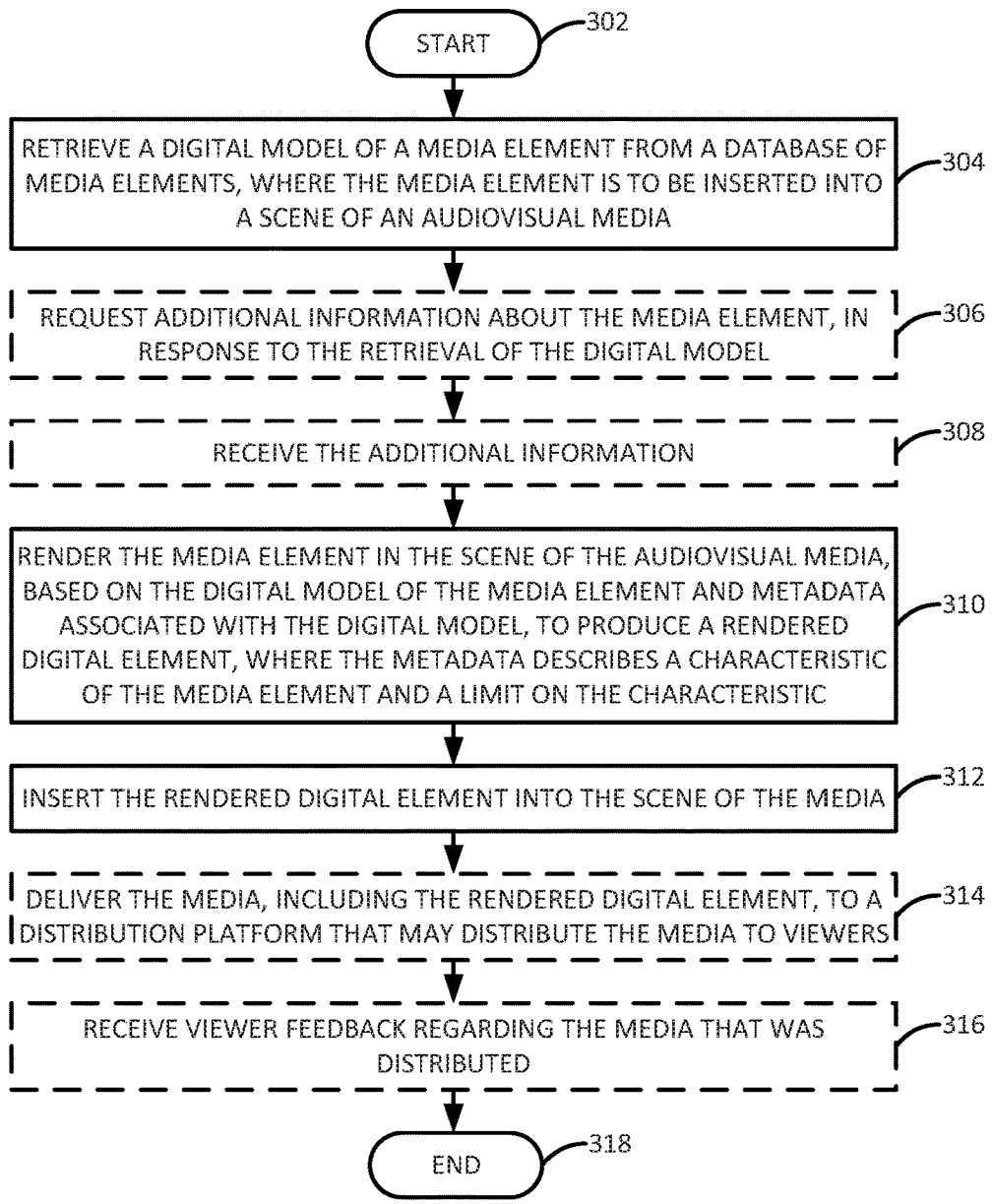
FIG. 3 illustrates a flowchart of an example method for inserting a legally and artistically faithful depiction of a media element into a media, in accordance with the present disclosure.

FIG. 3 illustrates a flowchart of an example method 300 for inserting a legally and artistically faithful depiction of a media element into a media, in accordance with the present disclosure. In one example, steps, functions and/or operations of the method 300 may be performed by a device as illustrated in FIG. 1, e.g., AS 104 or any one or more components thereof. In other examples, the method 300 may be performed in whole or in part on a user endpoint device such as UEs 108, 110, 112, and 114 or on an edge server or other edge device in the core network 102. In one example, the steps, functions, or operations of method 300 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 300 is described in greater detail below in connection with an example performed by a processing system, such as processing system 402.

The method 300 begins in step 302 and proceeds to step 304. In step 304, the processing system may retrieve a digital model (e.g., a three-dimensional model) of a media element from a database of media elements, where the media element is to be inserted into a scene of an audiovisual media. As discussed above, the media element may comprise an individual/character (e.g., an actor or an animated/computer generated character) or an object (e.g., a vehicle, a weapon, a landmark or a building, a prop, or the like) that is to be depicted in the media. The media may comprise a film, an episode of a television series, a commercial, a video game, an extended reality media, or the like. The media element may be a media element that has appeared in a previous media (e.g., the media into which the media element is being inserted may be a sequel film to a previous film in which the media element appeared, or may be a video game based on a film in which the media element appeared, etc.).

In optional step 306 (illustrated in phantom), the processing system may request additional information about the media element, in response to the retrieval of the digital model. The additional information may be needed by the processing system when the digital model and the metadata do not provide enough information to ensure a faithful rendering of the media element in the scene of the media. For instance, the media element may be a motorcycle, and the scene may require that the motorcycle make a left turn. However, the digital model may only contain information (e.g., video footage) of the motorcycle making right turns.

In optional step 308 (illustrated in phantom), the processing system may receive the additional information requested in step 306. For instance, the request may have been conveyed to a camera, which may provide new video footage or still images of the media element, or new metadata, that assists the processing system in modifying the digital model for insertion in the scene of the media. For instance, continuing the example above, the additional information may comprise video footage of the motorcycle turning left.

In step 310, the processing system may render the media element in the scene of the media, based on the digital model of the media element and metadata associated with the digital model (and optionally further based on additional information obtained in step 308), to produce a rendered media element, where the metadata describes a characteristic of the media element and a limit on the characteristic. As discussed above, in one example, the characteristic may comprise at least one of the following types of characteristics: a physical characteristic, a contextual characteristic, an audio characteristic, or a behavioral characteristic.

In one example, rendering the media element may comprise applying at least one production effect (as specified in the metadata) to the digital model. For instance, the production effect may comprise at least one of: a visual effect and an audio effect. Where the production effect is a visual effect, the production effect may modify the appearance of the digital model (and, optionally, the scene into which the media element is to be inserted). As an example, the production effect may alter the color of the digital model, alter the size of the digital model, add a shadow to be cast by the model, or otherwise modify the appearance of the digital model. Where the production effect is an audio effect, the production effect may alter a voice associated with the digital model (e.g., raise or lower the timbre, etc.), add a sound effect (e.g., the sound of a motorcycle engine, a weapon being used in battle, etc.). As discussed above, the production effect may also modify the appearance of the scene into which the media element is inserted (e.g., if the media element is a pair of glasses, a portion of the scene viewed through the glasses may be blurred, washed with color, or the like).

In step 312, the processing system may insert the rendered digital element into the scene of the media. For instance, the processing system may replace pixels of one or more frames of the media with pixels of the rendered digital element. The appearance, sound, context, and/or behavior of the rendered digital element may change slightly from one frame of the media to the next, e.g., to reflect movement of the digital element through the scene.

In optional step 314 (illustrated in phantom), the processing system may deliver the media, including the rendered digital element, to a distribution platform that may distribute the media to viewers. In some examples, the distribution platform (or the user endpoint device) may further modify the digital model according to a preference of a viewer (e.g., as indicated in a profile for the viewer) or according to the capabilities of the device on which the media is to be viewed (e.g., adjusting colors, lighting, audio, or the like to account for any limitations of the device).

In optional step 316 (illustrated in phantom), the processing system may receive viewer feedback regarding the media that was distributed. The feedback may comprise, for example, a query related to the media element. For instance, the viewer may wish to find out more information about the media element, such as other media in which the media element may have appeared, may wish to locate merchandise depicting the media element, or may wish to find other information. These types of queries may be directed to other systems such as web browsers, media databases or websites, e-commerce websites, or the like.

In another example, the feedback may be provided by a device, an application, or a physical token that is in proximity to a user. For instance, the processing system may query the distribution platform (e.g., the user's mobile device) in order to determine whether there are any toys that have metadata associated with a set of on-screen media elements being displayed. Depending on the response from the distribution platform (e.g., the presence of a toy is detected, or not detected), the rendered digital effects may be altered. For instance, the facial expression or clothing of a rendered character may be altered (but still kept within the known characteristic limits) in order to match that facial expression or clothing of a toy that is proximal to the user.

The method 300 may end in step 318.

Examples of the present disclosure therefore provide a way for media elements to be easily reused in different media in a manner that respects digital rights management. For instance, the ability to modify a pre-existing digital model of a media element for a new scene may be less costly than, say, rendering the media element in the scene from scratch, and may also help to ensure that the media element is depicted across media in a consistent manner. Moreover, the generation of the digital models and metadata for modification may provide content creators, actors, and other individuals associated with the media elements with new ways to monetize existing media elements while avoiding unfavorable or unflattering haphazard depictions of the media elements (which may affect the value of the media elements). In further examples, the maintenance of the digital models in a centralized location (such as a database) may allow the use of the media elements to be tracked and audited.

Further extensions of the disclosure may deliver rendered media element content to devices other than traditional media consumption devices (e.g., televisions, computers, smart phones, etc.). For instance, all or a portion of rendered content could be delivered, in real time, to a toy or prop in the viewer's vicinity which has the ability to receive signals. As an example, if the viewer is experiencing an extended reality media related to wizards, audio effects may be delivered to a toy wand in the viewer's hand.

In further extensions still, simulated media elements may be generated that incorporate some features of an existing media element, but may be modified to interact with other media elements. For instance, if an existing media element relates to a character who is short, the character may be graphically manipulated in the media so that the character is tall enough to perform an action such as drive a motorcycle.

It should be noted that the methods 200 and 300 may be expanded to include additional steps or may be modified to include additional operations with respect to the steps outlined above. In addition, although not specifically specified, one or more steps, functions, or operations of the methods 200 and 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for inserting a legally and artistically faithful depiction of a media element into a media, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300 or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or 300. In one example, instructions and data for the present module or process 405 for inserting a legally and artistically faithful depiction of a media element into a media (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for inserting a legally and artistically faithful depiction of a media element into a media (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
retrieving, by a processing system including at least one processor, a digital model of a media element from a database storing a plurality of media elements, wherein the media element is to be depicted in a scene of an audiovisual media;
rendering, by the processing system, the media element based on the digital model of the media element and on metadata associated with the digital model to produce a rendered media element, wherein the metadata describes a characteristic of the media element and a limit on the characteristic; and
inserting, by the processing system, the rendered media element into the scene of the audiovisual media, wherein the method further comprises, prior to the retrieving:
learning, by the processing system, the characteristic of the media element based on an analysis of a plurality of samples comprising at least one of: a plurality of images depicting the media element, a plurality of audio segments depicting the media element, or a plurality of text segments depicting the media element;
learning, by the processing system, the limit on the characteristic of the media element based on an analysis of the plurality of samples; and
encoding, by the processing system, the characteristic and the limit on the characteristic in the metadata.

2. The method of claim 1, wherein the media element is at least one of: an individual or an object.

3. The method of claim 1, wherein the characteristic is at least one of: a physical characteristic of the media element, an audio characteristic of the media element, a contextual characteristic of the media element, or a behavioral characteristic of the media element.

4. The method of claim 1, wherein the limit defines a range of values of the characteristic.

5. The method of claim 4, wherein the rendering comprises:
applying, by the processing system, a production effect to the digital model, such that a value of the characteristic in the rendered media element falls within the range of values.

6. The method of claim 5, wherein the production effect alters a physical appearance of the digital model.

7. The method of claim 5, wherein the production effect alters a sound of the digital model.

8. The method of claim 5, further comprising:
applying, by the processing system, the production effect to other portions of the scene of the audiovisual media in addition to the rendered media element.

9. The method of claim 1, wherein the metadata further describes a limitation on a use of the media element.

10. The method of claim 1, wherein the metadata further describes a fee for using the media element.

11. The method of claim 1, wherein the metadata further describes a set of alternatives, wherein each alternative in the set of alternatives is consistent with the limit on the characteristic.

12. The method of claim 1, further comprising:
generating, by the processing system prior to the retrieving, the digital model based on a plurality of images of the media element.

13. The method of claim 1, wherein the media element has appeared in at least one other media different from the audiovisual media into which the rendered media element is inserted.

14. The method of claim 13, wherein the digital model and the metadata contain information to ensure that the characteristic is depicted consistently in the scene of the audiovisual media and in the at least one other media.

15. The method of claim 1, further comprising, prior to the rendering:
requesting, by the processing system, additional information about the media element from a source other than the database, in response to determining that the digital model and the metadata do not provide enough information to render the media element for the scene of the audiovisual media,
wherein the rendering is further based on the additional information.

16. The method of claim 15, wherein the additional information comprises additional images of the media element.

17. The method of claim 16, wherein the additional images are provided in real time by a camera.

18. A non-transitory computer-readable medium storing instructions which, when executed by a processing system including at least one processor, cause the processing system to perform operations, the operations comprising:
retrieving a digital model of a media element from a database storing a plurality of media elements, wherein the media element is to be depicted in a scene of an audiovisual media;
rendering the media element based on the digital model of the media element and on metadata associated with the digital model to produce a rendered media element, wherein the metadata describes a characteristic of the media element and a limit on the characteristic; and
inserting the rendered media element into the scene of the audiovisual media, wherein the operations further comprise, prior to the retrieving:
learning the characteristic of the media element based on an analysis of a plurality of samples comprising at least one of: a plurality of images depicting the media element, a plurality of audio segments depicting the media element, or a plurality of text segments depicting the media element;
learning the limit on the characteristic of the media element based on an analysis of the plurality of samples; and
encoding the characteristic and the limit on the characteristic in the metadata.

19. The non-transitory computer readable medium of claim 18, wherein the operations further comprise, prior to the rendering:
requesting additional information about the media element, in response to determining that the digital model and the metadata do not provide enough information to render the media element for the scene of the audiovisual media,
wherein the rendering is further based on the additional information.

20. A device comprising:
a processing system including at least one processor; and
a non-transitory computer-readable medium storing instructions which, when executed by the processing system, cause the processing system to perform operations, the operations comprising:
retrieving a digital model of a media element from a database storing a plurality of media elements, wherein the media element is to be depicted in a scene of an audiovisual media;
rendering the media element based on the digital model of the media element and on metadata associated with the digital model to produce a rendered media element, wherein the metadata describes a characteristic of the media element and a limit on the characteristic; and
inserting the rendered media element into the scene of the audiovisual media, wherein the operations further comprise, prior to the retrieving:
learning the characteristic of the media element based on an analysis of a plurality of samples comprising at least one of: a plurality of images depicting the media element, a plurality of audio segments depicting the media element, or a plurality of text segments depicting the media element;
learning the limit on the characteristic of the media element based on an analysis of the plurality of samples; and
encoding the characteristic and the limit on the characteristic in the metadata.

* * * * *